(12) United States Patent
Kim et al.

(10) Patent No.: US 6,727,988 B2
(45) Date of Patent: Apr. 27, 2004

(54) SPECTROPHOTOMETER WITH DRIVE MEANS AND SPECTROPHOTOMETRY USING SUCH

(75) Inventors: Soo Hyun Kim, Taejon (KR); Kyung Chan Kim, Taejon (KR); Se Baek Oh, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/832,551

(22) Filed: Apr. 11, 2001

(65) Prior Publication Data

US 2002/0101586 A1 Aug. 1, 2002

(30) Foreign Application Priority Data

Dec. 1, 2000 (KR) ........................................ 2000-72556

(51) Int. Cl.[7] ................................................ G01J 3/427
(52) U.S. Cl. ........................ 356/319; 356/303; 356/309; 356/322; 356/326
(58) Field of Search ............................... 356/319, 401, 356/356; 318/116

(56) References Cited

U.S. PATENT DOCUMENTS

| 3,889,166 A | * | 6/1975 | Scurlock | ...................... | 318/116 |
| 5,220,184 A |   | 6/1993 | Philbrick et al. | | |
| 5,861,954 A | * | 1/1999 | Israelachvili | ................ | 356/356 |
| 5,920,389 A |   | 7/1999 | Bungo | | |

FOREIGN PATENT DOCUMENTS

DE  3818044 A1 * 11/1989 ................. 356/401

OTHER PUBLICATIONS

Knoll, P. et al, Improving Spectroscopic Techniques by a Scanning Multichannel Method, Applied Spectroscopy, vol. 44, No. 5, 1990, pp. 776–782.

* cited by examiner

Primary Examiner—Audrey Chang
Assistant Examiner—Craig Curtis
(74) Attorney, Agent, or Firm—Richard M. Goldberg

(57) ABSTRACT

A spectrophotometer and spectrophotometry method, using a precision drive at a photodiode array which precisely moves the photodiode array by a distance equal to the physical interval between the photodiodes of the photodiode array so that the spectrophotometer and spectrophotometry method primarily measures light intensities of incident light by the photodiode array, and when precisely moves the photodiode array using the drive by the distance equal to the physical interval between photodiodes of the photodiode array, measures the light intensities of the incident light at desired positions corresponding to the intervals.

11 Claims, 5 Drawing Sheets

SPECTROPHOTOMETER WITH DRIVE MEANS AND SPECTROPHOTOMETRY USING SUCH

BACKGROUND OF THE INVENTION

1. Field of the Invention

The present invention relates to a spectrophotometer and spectrophotometry capable of measuring intensity of light transmitted through a target sample and, more particularly, to a spectrophotometer provided with a precision drive means at its light intensity measuring unit for precisely moving said light intensity measuring unit, thus precisely measuring light intensity at any desired points, the present invention also relating to a spectrophotometry using such a spectrophotometer.

2. Description of the Prior Art

Figure 1:
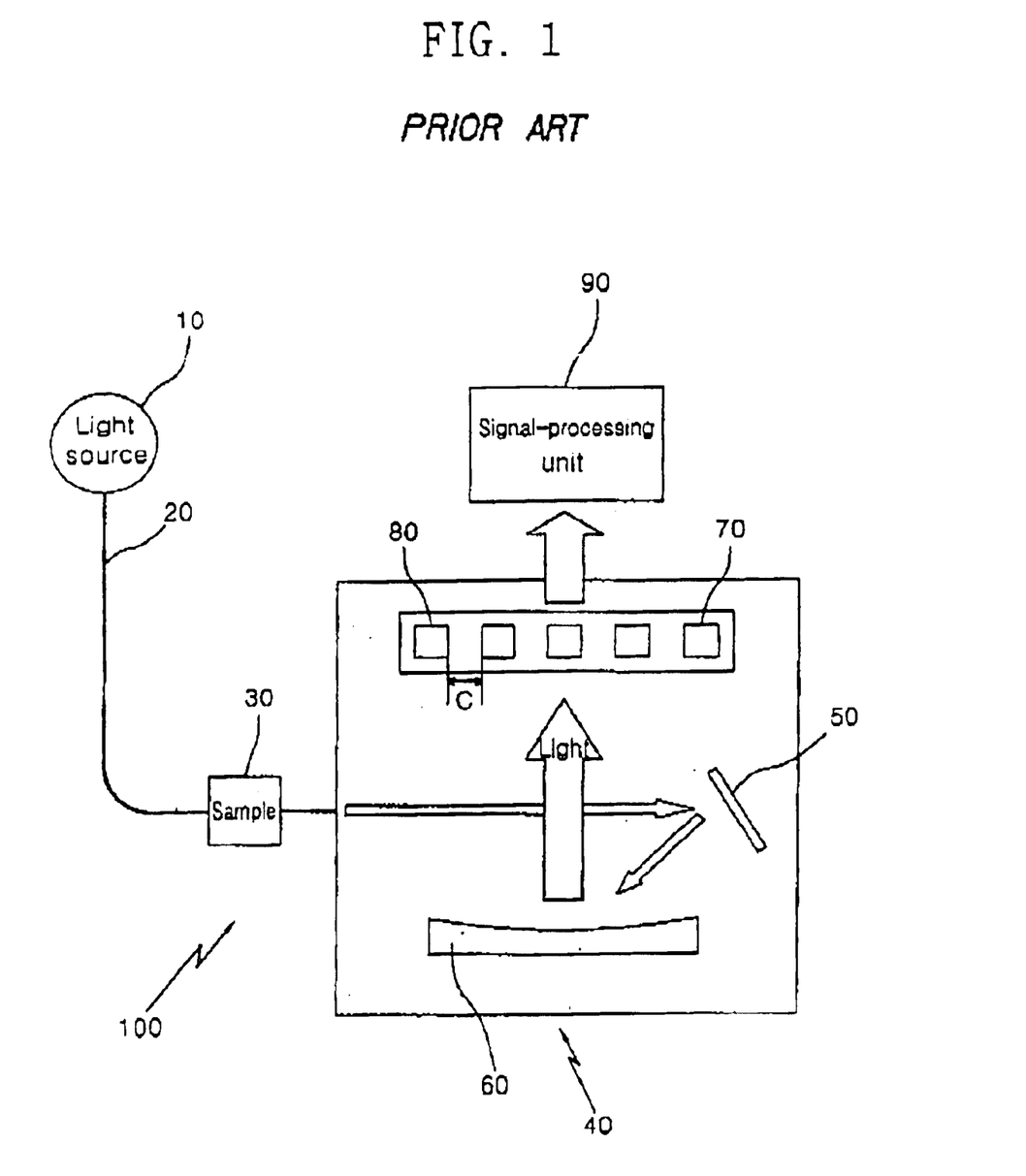
FIG. 1 is a diagram, schematically showing the construction of a conventional spectrophotometer.

A conventional spectrophotometer and a spectrophotometry using such a conventional spectrophotometer will be described as follows:

FIG. 1 shows the construction of a conventional spectrophotometer. As shown in the drawing, the conventional spectrophotometer 100 comprises a light source 10 emitting a light beam having a predetermined wavelength range, and an optical fiber 20 guiding the light beam from the light source 10 to a target sample 30. The spectrophotometer 100 also comprises a spectrometer head 40 and a signal-processing unit 90. The spectrometer head 40 receives the light beam transmitted through the target sample 30, and diffracts the light beam into discrete wavelengths to produce optical spectra, and measures light intensities of the optical spectra. The signal-processing unit 90 receives spectrometric analysis data of the target sample 30 from the spectrometer head 40, and reproduces the distribution of light intensities of the spectra.

In the above spectrophotometer 100, the spectrometer head 40 comprises a reflective diffraction grating 50, a concave mirror 60, and a photodiode array 70. The reflective diffraction grating 50 is used for diffracting the light beam, transmitted through the target sample 30, into discrete wavelengths to produce optical spectra. The concave mirror 60 reflects the diffracted light from the diffraction grating 50, while the photodiode array 70 measures the intensity of incident light reflected by the concave mirror 60.

The photodiode array 70 comprises a plurality of photodiodes 80 linearly arranged on a longitudinal mount at regular physical intervals "C". The photodiodes 80 are devices, each of which is selectively activated to allow an electric current to flow through it in response to incident light, thus generating an output voltage that is almost proportional to the intensity of the incident light.

The optical spectra, produced through the diffraction of the light beam by the grating 50 into discrete wavelengths, are received by the photodiode array 70, thus being measured in light intensity according to the wavelength. After a measurement of the light intensities of the optical spectra, the photodiode array 70 outputs spectrometric analysis data of the target sample 30 to the signal-processing unit 90. Upon receiving the spectrometric analysis data of the target sample 30 from the photodiode array 70 of the spectrometer head 40, the signal-processing unit 90 reproduces the distribution of light intensities of the spectra, and performs photometric comparisons of the spectrometric analysis data of the target sample 30 with those of a reference sample so as to identify and measure the components and contents of the target sample 30.

Figure 2:
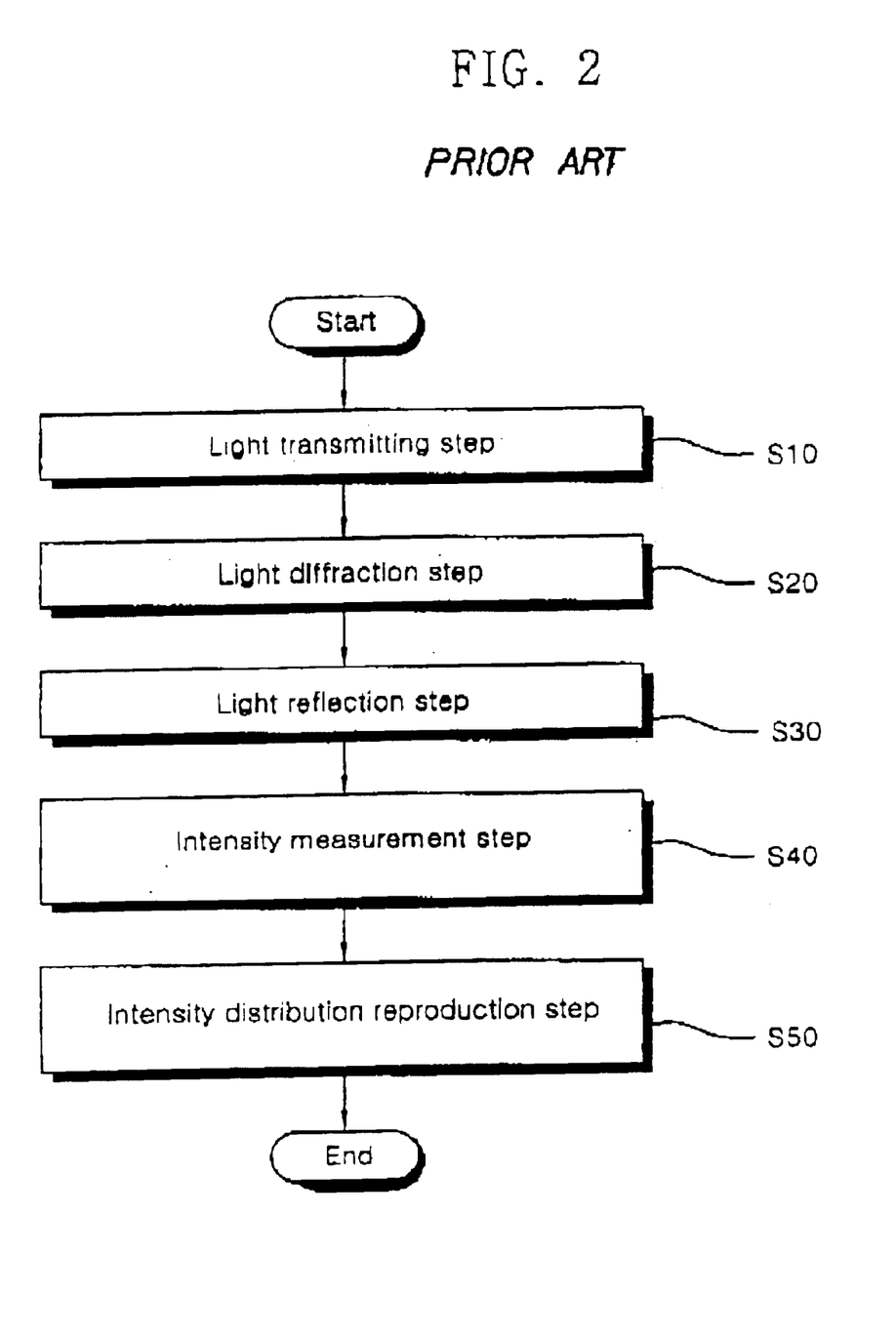
FIG. 2 is a flowchart of a spectrophotometry using a conventional spectrophotometer.

FIG. 2 is a flowchart of a spectrophotometry using the conventional spectrophotometer.

As shown in the drawing, the spectrophotometry using the conventional spectrophotometer 100 comprises five steps, that is, a light transmitting step S10, a light diffraction step S20, a light reflection step S30, an intensity measurement step S40 and an intensity distribution reproduction step S50.

At the first step, the so-called light transmitting step S10, a light beam, emitted from the light source 10, is guided to the target sample 30 through the optical fiber 20, and is transmitted through the sample 30.

At the second step, the so-called light diffraction step S20, the light beam transmitted through the sample 30 is received into the reflective diffraction grating 50 of the spectrometer head 40, thus being diffracted to produce optical spectra.

At the third step, the so-called light reflection step S30, the optical spectra of the diffracted light beam are reflected by the concave mirror 60 to the photodiode array 70.

At the fourth step, the so-called intensity measurement step S40, the photodiode array 70 measures the light intensities of the incident optical spectra according to wavelength, thus obtaining spectrometric analysis data, such as the characteristics of the spectra according to wavelength.

At the fifth step, the so-called intensity distribution reproduction step S50, the spectrometric analysis data are transmitted from the photodiode array 70 to the signal-processing unit 90. Upon reception of the spectrometric analysis data from the photodiode array 70, the signal-processing unit 90 reproduces the light intensity distribution and performs spectrometric comparisons of said data with those of a reference sample, thus identifying and measuring the components and contents of the target sample 30. The signal-processing unit 90 is thus able to provide the characteristics of light diffracted into discrete wavelengths.

In the conventional spectrophotometer 100, the photodiodes 80 are linearly arranged along a longitudinal mount at regular intervals "C" to form a photodiode array 70. However, the spectrophotometer 100 is problematic in that it is almost impossible to sense light at the intervals "C" between the photodiodes 80.

The intervals "C" between the photodiodes 80 also reduce the resolving power of the conventional spectrophotometer 100, and so the spectrophotometer 100 is not suitable for use in a precision measurement.

In the prior art, it has been actively studied to linearly arrange an increased number of photodiodes along the mount of a photodiode array to reduce the intervals "C" in an effort to solve the problems caused by said intervals "C". However, the linear arrangement of such an increased number of photodiodes undesirably lengthens the signal processing time, and so it is almost impossible to use a spectrophotometer, having a photodiode array with such an increased number of photodiodes, in a real time measurement.

Another problem, experienced with such an increased number of photodiodes of a photodiode array, resides in that said increase undesirably results in a reduction in the size of each photodiode, and so the photodiodes may be easily saturated with light intensity.

SUMMARY OF THE INVENTION

Accordingly, the present invention has been made keeping in mind the above problems occurring in the prior art, and an object of the present invention is to provide a spectrophotometer and spectrophotometry, which uses a precision drive means capable of improving the resolving power during a measurement of light intensity.

Another object of the present invention is to provide a spectrophotometer and spectrophotometry, which uses a precision drive means attached to the photodiode array, thus precisely measuring light intensity while moving as desired.

In order to accomplish the above objects, an embodiment of the present invention provides a spectrophotometer, comprising: a light source used for emitting a light beam having a predetermined wavelength range; a light guiding means for guiding the light beam from the light source to a target sample; a spectrometer head consisting of a light diffracting means for diffracting the light beam transmitted through the target sample to produce optical spectra, a light reflecting means for reflecting the diffracted light from the light diffracting means, a light intensity measuring means for measuring intensity of incident light reflected by the light reflecting means, a drive means for reciprocating the intensity measuring means within a predetermined range, and a stop means for limiting a reciprocating movement of the intensity measuring means; and a signal-processing unit used for reproducing a distribution of light intensities measured by the light intensity measuring means of the spectrometer head.

In the preferred embodiment of this invention, it is preferable to use a multimode optical fiber as the light guiding means.

In addition, it is preferable to use a reflective diffraction grating as the light diffracting means.

It is also preferable to use a concave mirror as the light reflecting means.

In addition, the intensity measuring means preferably comprises a photodiode array, with a plurality of photodiodes linearly arranged on a longitudinal mount at regular physical intervals.

In an embodiment, the drive means preferably comprises a piezoelectric drive unit physically expandable or contractible in accordance with the level of an applied voltage.

In another embodiment, the drive means preferably comprises a bimorph cell consisting of: a piezoelectric drive plate physically expandable or contractible in accordance with the level of an applied voltage; and a piezoelectric fixing plate cemented together with the bimorph piezoelectric drive plate and being physically expandable or contractible in accordance with the level of the applied voltage.

On the other hand, the stop means preferably comprises two stoppers arranged at predetermined positions around opposite ends of the intensity measuring means of the spectrometer head in a moving direction of the intensity measuring means so as to limit the reciprocating movement of the intensity measuring means.

When using a piezoelectric drive unit as the drive means, it is more preferable to use a displacement amplifier attached to the piezoelectric drive unit for amplifying a displacement of the piezoelectric drive unit.

On the other hand, when using a bimorph cell consisting of a piezoelectric drive plate cemented together with a piezoelectric fixing plate as the drive means, the two piezoelectric plates are different from each other in their coefficients of expansion and coefficients of contraction in response to an applied voltage.

Another embodiment of the present invention provides a spectrophotometry using a spectrophotometer with drive means, comprising: a light transmitting step of guiding a light beam from a light source to a target sample through a multimode optical fiber so as to allow the light beam to be partially transmitted through the sample; a light diffraction step of receiving the light beam, transmitted through the sample, into a reflective diffraction grating, thus diffracting the light beam into discrete wavelengths to produce optical spectra; a light reflection step of reflecting the optical spectra of the diffracted light beam by a concave mirror to a photodiode array; a first intensity measurement step of measuring light intensities of the incident optical spectra by the photodiode array; a second intensity measurement step of moving the photodiode array using the drive means by a distance equal to the physical interval between photodiodes of the photodiode array and measuring light intensities of the incident optical spectra at desired positions corresponding to the intervals; and an intensity distribution reproduction step of transmitting spectrometric analysis data, obtained at the first and second intensity measurement steps, from the photodiode array to a signal-processing unit, and reproducing a light intensity distribution of the target sample by the signal-processing unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

In the description of the present invention, the term "the spectrophotometer" denotes a device that is used for diffracting a light beam transmitted through a target sample so as to measure the transmittance and absorptance of the sample. The spectrophotometer of this invention may be preferably used for analysis of residual pesticide, water pollution level, microbial contamination level, blood and protein in addition to analysis of contents and concentrations of target samples.

In addition, the term "photodiode" used in the description of the present invention denotes a device that is selectively activated to allow an electric current to flow through it in response to incident light, and generates an output voltage almost proportional to the intensity of the incident light. In the spectrophotometer of this invention, the photodiode is used for measuring intensity of incident light transmitted through a target sample.

The spectrophotometer with a precision drive means and a spectrophotometry using such a spectrophotometer according to the present invention will be described in detail herein below.

Figure 3:
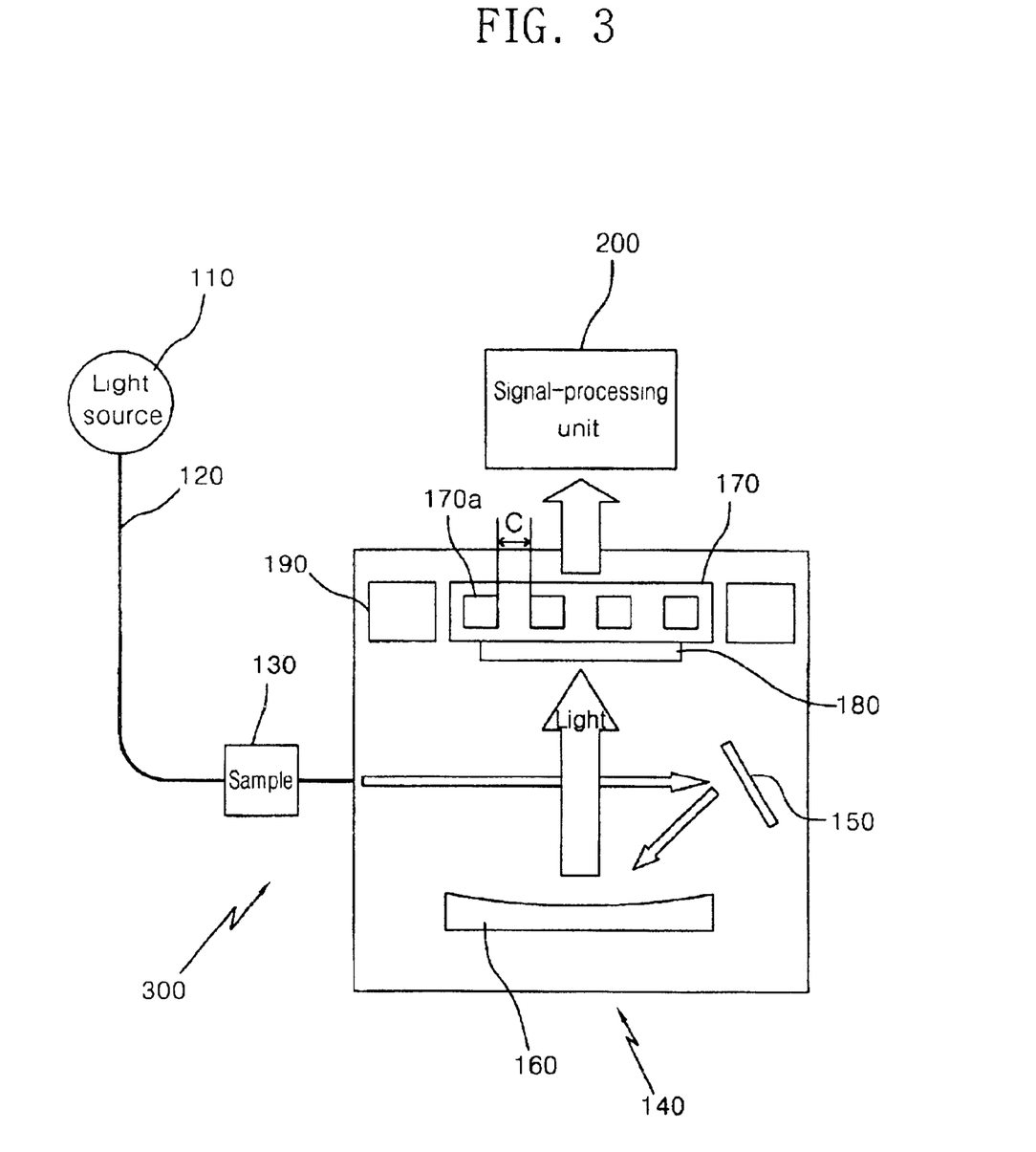
FIG. 3 is a diagram, schematically showing the construction of a spectrophotometer having a precision drive means in accordance with the preferred embodiment of the present invention.
Figure 4:
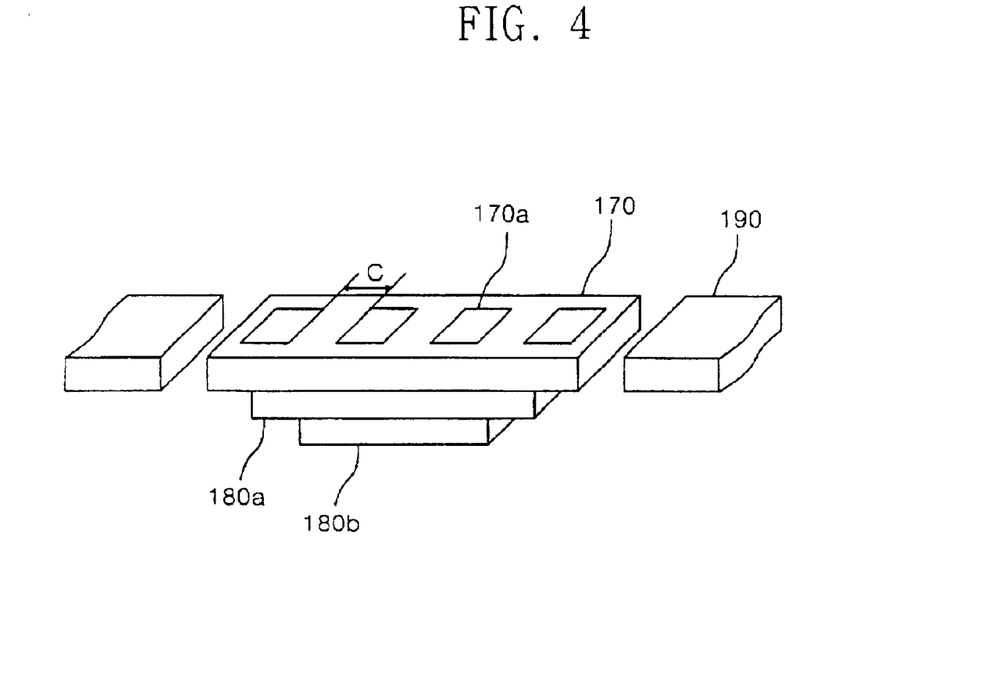
FIG. 4 is a perspective view, showing the construction of both a precision drive means and a stop means included in the spectrophotometer in accordance with the primary embodiment of the present invention.
Figure 5:
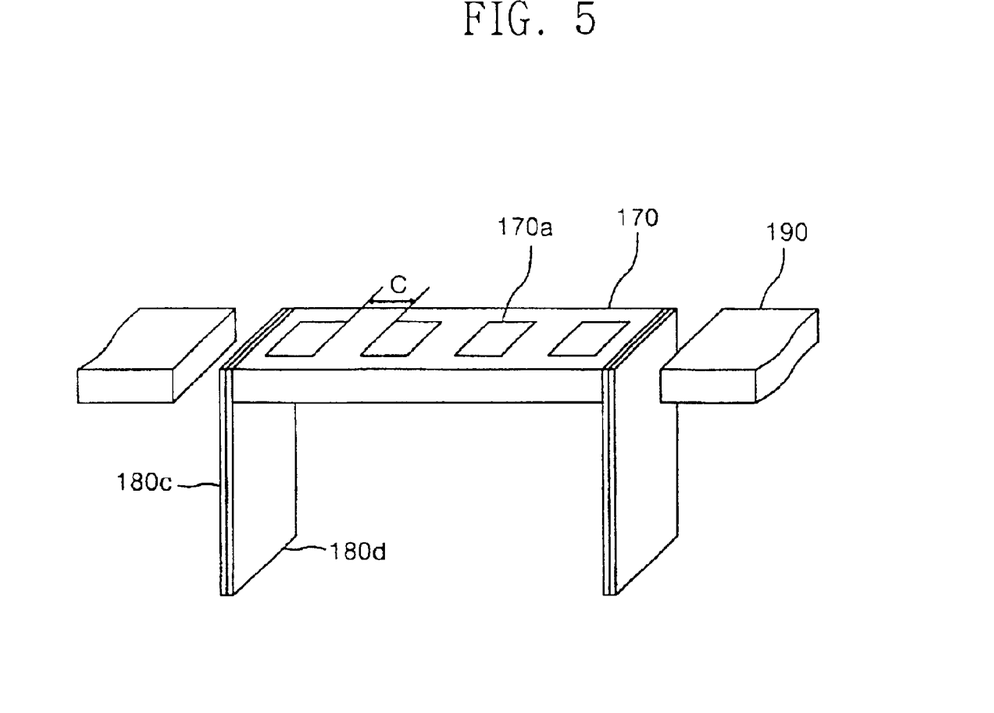
FIG. 5 is a perspective view, showing the construction of both a precision drive means and a stop means included in the spectrophotometer in accordance with the second embodiment of the present invention.

FIG. 3 is a diagram, schematically showing the construction of a spectrophotometer 300 having a precision drive means in accordance with the preferred embodiment of the present invention. FIG. 4 is a perspective view, showing the construction of both a precision drive means and a stop means included in the spectrophotometer in accordance with the primary embodiment of this invention. FIG. 5 is a view corresponding to FIG. 4, but showing the construction of both a precision drive means and a stop means in accordance with the second embodiment of this invention.

As shown in the drawings, the spectrophotometer 300 according to the preferred embodiment of this invention comprises a light source 110 emitting a light beam having a predetermined wavelength range, and a light guiding means used for guiding the light beam from the light source 110 to a target sample 130. The spectrophotometer 300 also comprises a spectrometer head 140 and a signal-processing unit 200. The spectrometer head 140 receives the light beam transmitted through the target sample 130, and diffracts the light beam into discrete wavelengths to produce optical spectra, and measures light intensities of the optical spectra so as to measure the spectrometric characteristics of diffracted light and produce spectrometric analysis data of the target sample 130. The signal-processing unit 200 receives the spectrometric analysis data of the target sample 130 from the spectrometer head 140, and reproduces a distribution of light intensities of the spectra, and provides the characteristics of light diffracted into discrete wavelengths.

In the spectrophotometer 300 of this invention, the spectrometer head 140 comprises a light diffracting means, a light reflecting means, an intensity measuring means, a drive means and a stop means. In the spectrometer head 140, the light diffracting means is used for diffracting the light beam transmitted through the target sample 130 to produce optical spectra. The light reflecting means is used for reflecting the diffracted light from the diffracting means, while the intensity measuring means is used for measuring the intensity of incident light reflected by the light reflecting means. The drive means is used for reciprocating the intensity measuring means within a predetermined range, while the stop means is used for limiting the reciprocating movement of the intensity measuring means.

In the spectrometer head 140, the light diffracting means is used for diffracting an incident light beam into discrete wavelengths to produce optical spectra. In the present invention, a reflective diffraction grating 150 is used as the light diffracting means. In addition, a concave mirror 160 is used as the light reflecting means, while a photodiode array 170 is used as the intensity measuring means.

On the other hand, a multimode optical fiber 120 is used as the light guiding means for guiding a light beam from the light source 110 to the target sample 130.

The photodiode array 170 comprises a plurality of photodiodes 170a linearly arranged on a longitudinal mount at regular physical intervals "C" of several micrometers to several ten micrometers. The photodiode array 170 senses light diffracted into discrete wavelengths, and measures the spectrometric characteristics of the diffracted light, and outputs spectrometric analysis data of the light to the signal-processing unit 200.

The drive means 180 is provided at the photodiode array 170 for moving the array 170 within a predetermined range. In such a case, the moving range of the photodiode array 170 is limited by the stop means. In such a case, the moving range of the photodiode array 170 is determined by the physical intervals "C" of the photodiodes 170a. The photodiode array 170 cannot sense any light at the physical intervals "C" of the photodiodes 170a, and so it is impossible for the array 170 to measure the characteristics of diffracted light at said intervals "C".

However, the spectrophotometer 300 of the present invention is designed to allow the photodiode array to sense light at such intervals "C". This object is accomplished by the precision drive means 180 provided at the photodiode array 170 for precisely moving the array 170 within a micro distance of several micrometers to several ten micrometers. Due to the drive means 180, the photodiode array 170 can precisely move by a distance of the physical interval "C", and so the array 170 more precisely measure the spectrometric characteristics of diffracted light at desired points.

In the primary embodiment of the present invention, a piezoelectric drive unit 180a is used as the drive means 180 as shown in FIG. 4. The piezoelectric drive unit 180a of this embodiment is mounted to the lower surface of the photodiode array 170, and physically expands or contracts in accordance with the level of an applied voltage, thus precisely moving the photodiode array 170 within such a micro distance. In order to amplify the displacement of the piezoelectric drive unit 180a as desired, a displacement amplifier 180b is attached to the lower surface of the drive unit 180a.

Due to the piezoelectric drive unit 180a with the displacement amplifier 180b, the photodiode array 170 can be precisely movable by a distance of the physical interval "C", and so it is possible to improve the resolving power of the spectrophotometer 300 of this invention.

In the second embodiment of this invention, a bimorph cell, consisting of a bimorph piezoelectric drive plate 180c cemented together with a bimorph piezoelectric fixing plate 180d, is used as the drive means 180 for the photodiode array 170 as shown in FIG. 5. The bimorph cell physically expands or contracts in accordance with the level of an applied voltage, thus precisely moving the photodiode array 170 within a desired micro distance.

In the bimorph cell according to the second embodiment, the bimorph piezoelectric drive plate 180c and the bimorph piezoelectric fixing plate 180d cemented together are different from each other in their coefficients of expansion and coefficients of contraction. Therefore, an applied voltage causes one of the two piezoelectric plates 180c and 180d to expand and the other to contract so that the cell bends in proportion to the applied voltage, thus precisely moving the photodiode array 170 within the desired micro distance.

On the other hand, the stop means is used for limiting the reciprocating movement of the photodiode array 170. In the preferred embodiment, two stoppers 190 are arranged at predetermined positions around opposite ends of the photodiode array 170 in the moving direction of said array 170. The stoppers 190 thus effectively limit the reciprocating movement of the photodiode array 170.

Figure 6:
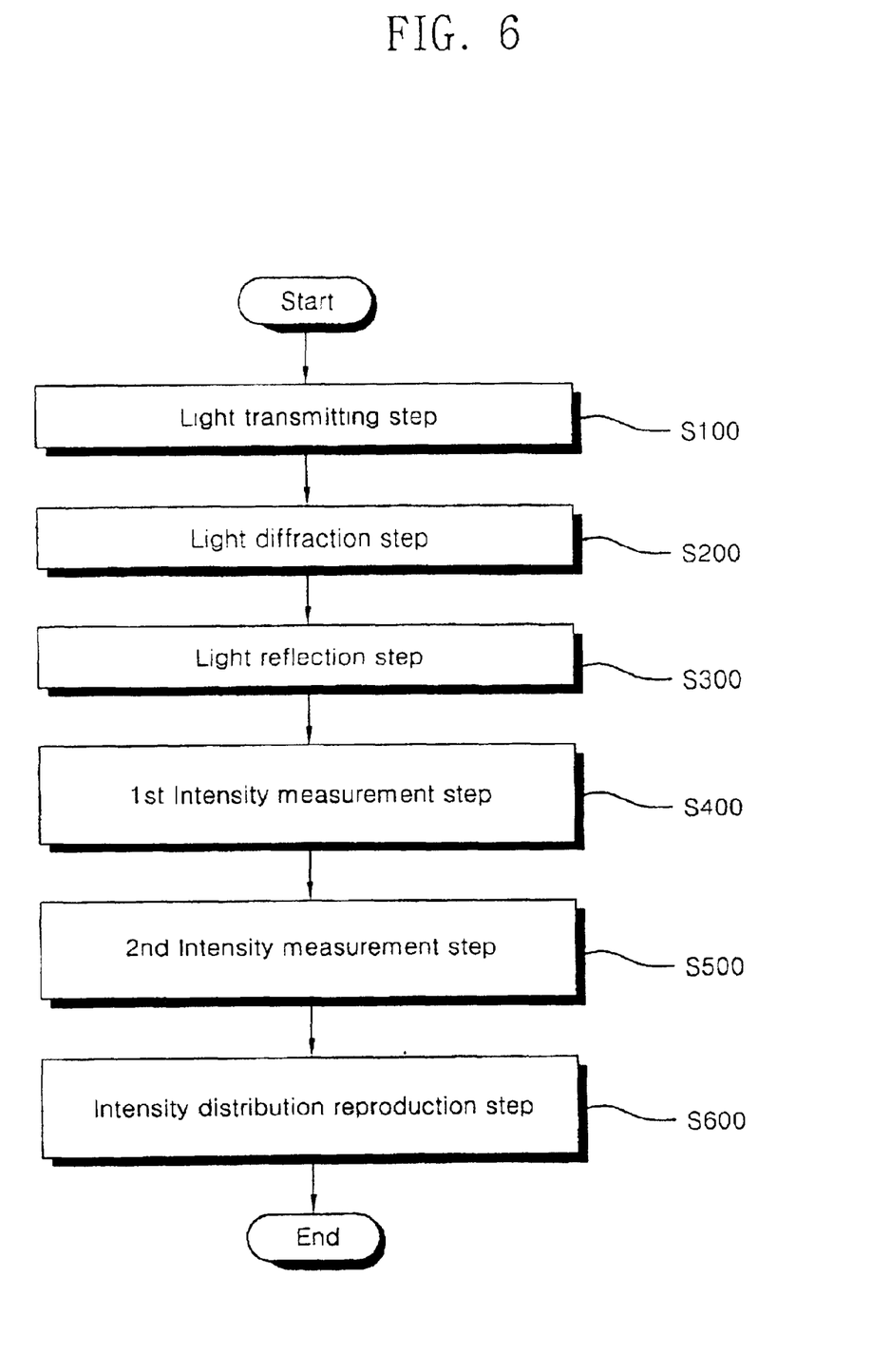
FIG. 6 is a flowchart of a spectrophotometry using the spectrophotometer of this invention.

FIG. 6 is a flowchart of a spectrophotometry using the spectrophotometer with the precision drive means of this invention.

As shown in the drawing, the spectrophotometry using the spectrophotometer 300 comprises six steps, that is, a light transmitting step S100, a light diffraction step S200, a light reflection step S300, a first intensity measurement step S400, a second intensity measurement step S500, and an intensity distribution reproduction step S600.

At the first step, the so-called light transmitting step S100, a light beam, emitted from the light source 110, is guided to the target sample 130 through the multimode optical fiber 120 having a predetermined length, and is transmitted through the sample 130. When the light beam passes through the sample 130, part of the light is absorbed by the sample 130, while the remaining part of the light is transmitted through the sample 130. In such a case, the ratio of the amount of light absorbed by the sample 130 to the total incident light is a so-called "absorptance", while the ratio of the amount of light transmitted through the sample 130 to the total incident light is a so-called "transmittance".

At the second step, the so-called light diffraction step S200, the light beam transmitted through the sample 130 is received into the reflective diffraction grating 150 of the spectrometer head 140, thus being diffracted into discrete wavelengths to produce optical spectra.

At the third step, the so-called light reflection step S300, the optical spectra of the diffracted light beam are reflected by the concave mirror 160 to the photodiode array 170.

At the fourth step, the so-called first intensity measurement step S400, the photodiode array 170 measures the light intensities of the incident optical spectra according to wavelength, thus obtaining spectrometric analysis data, such as the spectrometric characteristics of the spectra according to wavelength.

At the fifth step, the so-called second intensity measurement step S500, the drive means 180 precisely moves the photodiode array 170 by a distance equal to one physical interval "C" between the photodiodes 170a, and so it is possible for the photodiode array 170 to more precisely measure the light intensities of the optical spectra at said intervals "C". Since the intervals "C" are spaces between the photodiodes 170a, it is impossible for the photodiodes 170a to sense light or measure light intensities at the intervals "C" during the first intensity measurement step S400.

Therefore, the drive means 180 precisely moves the photodiode array 170 by the distance equal to the physical interval "C" between the photodiodes 170a in order to allow the photodiode array 170 to sense light at the positions occupied by the intervals "C" at the first intensity measurement step S400. Therefore, the photodiode array 170 almost completely senses entire optical spectra, thus more precisely measuring the intensities of entire incident light and the spectrometric characteristics of said light. The resolving power of the spectrophotometer 300 of this invention is thus improved.

At the sixth step, the so-called intensity distribution reproduction step S600, the spectrometric analysis data obtained at the first and second intensity measurement steps S400 and S500 is transmitted from the photodiode array 170 to the signal-processing unit 200. Upon reception of the spectrometric analysis data from the photodiode array 170, the signal-processing unit 200 reproduces the light intensity distribution and performs spectrometric comparisons of said data with those of a reference sample, thus precisely identifying and measuring the components, characteristics and contents of the target sample 130.

In the spectrophotometry using the spectrophotometer 300 having the precision drive means of this invention, the order of the first and second intensity measurement steps S400 and S500 may be changed. That is, the second intensity measurement steps S500 may be performed prior to the first intensity measurement step S400 without affecting the functioning of the present invention. In addition, a piezoelectric drive unit 180a having a displacement amplifier 180b or a bimorph cell consisting of two piezoelectric plates 180c and 180d cemented together is used as the drive means 180 in the preferred embodiments of the present invention. However, it should be understood that an electric motor or a hydraulic motor in place of the above-mentioned piezoelectric devices may be used as the drive means 180 without affecting the functioning of the present invention.

As described above, the present invention provides a spectrophotometer and spectrophotometry, which uses a precision drive means at the photodiode array used as the light intensity measuring means. Due to the drive means, it is possible for the spectrophotometer to perform a real time measurement of light intensity at any desired positions, and so the resolving power of the spectrophotometer during a measurement of light intensity is improved. In addition, the improvement in the resolving power of the spectrophotometer is accomplished by an easy and simple attachment of the drive means on the photodiode array of a conventional spectrophotometer without changing the construction of said spectrophotometer. Therefore, the present invention provides a spectrophotometer and spectrophotometry capable of precisely measuring light intensity without increasing the cost.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A spectrophotometer, comprising:
    a light source used for emitting a light beam having a predetermined wavelength range;
    a light guide for guiding the light beam from the said light source to a target sample;
    a spectrometer head including:
        a light diffractor for diffracting the light beam transmitted through the target sample to produce optical spectra,
        a light reflector for reflecting the diffracted light from the light diffractor,
        a light intensity measuring arrangement for measuring intensity of incident light reflected by the light reflector, said light intensity measuring arrangement having a photodiode array with a plurality of photodiodes linearly arranged on a longitudinal mount at regular physical intervals,
        a drive for reciprocating the light intensity measuring arrangement a distance equal to a physical interval between photodiodes of said photodiode array to at least two different discrete positions, and
        a stop for limiting a reciprocating movement of the light intensity measuring arrangement; and
    a signal-processing unit used for generating a combined distribution of light intensities measured by the light intensity measuring arrangement of the spectrometer head at each of the two different positions.

2. The spectrometer according to claim 1, wherein said light guide comprises a multimode optical fiber.

3. The spectrometer according to claim 1, wherein said light diffractor comprises a reflective diffraction grating.

4. The spectrometer according to claim 1, wherein said light reflector comprises a concave mirror.

5. The spectrometer according to claim 1, wherein said drive comprises a piezoelectric drive unit physically expandable or contractible in accordance with a level of applied voltage.

6. The spectrometer according to claim 1, wherein said drive comprises:
    a bimorph piezoelectric drive plate physically expandable and contractible in accordance with a level of an applied voltage; and a bimorph piezoelectric fixing plate cemented together with said bimorph piezoelectric drive plate, said bimorph piezoelectric fixing plate being physically expandable and contractible in accordance with the level of the applied voltage.

7. The spectrometer according to claim 1, wherein said stop comprises two stoppers arranged at predetermined positions around opposite ends of the light intensity measuring arrangement of the spectrometer head in a moving direction of said light intensity measuring arrangement so as to limit reciprocating movement of the light intensity measuring arrangement.

8. The spectrometer according to claim 5, wherein a displacement amplifier is attached to said piezoelectric drive unit for amplifying a displacement of the piezoelectric drive unit.

9. The spectrometer according to claim 6, wherein said bimorph piezoelectric drive plate and said bimorph piezoelectric fixing plate cemented together are different from each other in their coefficients of expansion and coefficients of contraction in response to an applied voltage.

10. The spectrometer according to claim 1, wherein at least one of said two different positions is defined by said light intensity measuring arrangement against the stop.

11. A spectrophotometry method using a spectrophotometer with a drive, comprising the steps of:

a light transmitting step of guiding a light beam from a light source to a target sample through a multimode optical fiber so as to allow the light beam to be partially transmitted through said sample;

a light diffraction step of receiving the light beam, transmitted through said sample, into a reflective diffraction grating, thus diffracting the light beam into discrete wavelengths to produce optical spectra;

a light reflection step of reflecting the optical spectra of the diffracted light beam by a concave mirror to a photodiode array;

a first intensity measurement step of measuring light intensities of the incident optical spectra by the photodiode array at a first position;

a step of moving the photodiode array using a drive by a distance equal to a physical interval between photodiodes of said photodiode array to a second position;

repeating the steps of light transmitting, light diffraction and a light reflection;

a second intensity measurement step of measuring light intensities of the incident optical spectra by the photodiode array corresponding to said intervals at the second position; and an intensity distribution generation step of transmitting spectrometric analysis data, obtained at the first and second intensity measurement step, from the photodiode array to a signal-processing unit, and generating a combined light intensity distribution of the target sample by the signal-processing unit corresponding to measured light intensities at the first and second positions.

* * * * *